(12) United States Patent
Martin et al.

(10) Patent No.: US 7,703,091 B1
(45) Date of Patent: Apr. 20, 2010

(54) METHODS AND APPARATUS FOR INSTALLING AGENTS IN A MANAGED NETWORK

(75) Inventors: Sylvia Martin, Shrewsbury, MA (US);
Ethan D. Roberts, Natick, MA (US);
Boris Farizon, Westborough, MA (US);
Mordechai Zvi Zur, Newton, MA (US);
Benjamin Thrift, Reston, VA (US);
Anoop George Ninan, Milford, MA (US); Christopher M. Barrett, Medway, MA (US); Terrence Lewis, Accokeek, MD (US); Nigel B. Hislop, Springfield, VA (US); Wesley A. Scott, Nottingham, NH (US); Dongjun Sun, Malborough, MA (US); Paul Clark, Boxboro, MA (US)

(73) Assignee: EMC Corporation, Hopkinton, MA (US)

( * ) Notice: Subject to any disclaimer, the term of this patent is extended or adjusted under 35 U.S.C. 154(b) by 238 days.

(21) Appl. No.: 11/081,177

(22) Filed: Mar. 16, 2005

Related U.S. Application Data

(63) Continuation-in-part of application No. 10/335,650, filed on Dec. 31, 2002, now abandoned.

(51) Int. Cl.
G06F 9/445 (2006.01)
(52) U.S. Cl. ...................................... 717/174; 717/172
(58) Field of Classification Search ....................... None
See application file for complete search history.

(56) References Cited

U.S. PATENT DOCUMENTS

| | | | |
|---|---|---|---|
| 6,199,204 B1 * | 3/2001 | Donohue | 717/178 |
| 6,353,928 B1 * | 3/2002 | Altberg et al. | 717/175 |
| 7,080,372 B1 * | 7/2006 | Cole | 717/173 |
| 7,107,330 B1 * | 9/2006 | Hamilton et al. | 709/221 |
| 2002/0013832 A1 * | 1/2002 | Hubbard | 709/220 |

* cited by examiner

*Primary Examiner*—Chuck O Kendall
(74) *Attorney, Agent, or Firm*—Chapin IP Law, LLC

(57) ABSTRACT

An agent installer operates to install an agent on a plurality of host computer systems using a bulk automated installation process that identifies at least one agent to be installed on a plurality of host computer systems and performs prerequisite checking of each of the plurality of host computer systems to determine which host computer systems of the plurality of host computer system are capable of supporting operation of the at least one agent. For each host computer system of the plurality of host computer systems that is capable of supporting operation of the at least one agent, the agent installer performs an automated bulk agent installation operation to install the at least one agent on that host computer system.

20 Claims, 11 Drawing Sheets

Agent Patch Deployment

This wizard allows you to apply software patches to agents on remote hosts.

Select one or more available hosts from the following list of hosts(s). Hosts are available if they have an active Master Agent, are not performing other agent administration tasks, and have agents that may be patched.

| Host | Status | OS Name | OS Version |
|---|---|---|---|
| pioneer-mp01-host | ● No Master Agent | Windows 2000 | 5.0, Service Pack 4 |
| slcdev204 | ● No products to upgrade | Solaris 2.7 | 2.7, Generic_106541-00 |
| slcdev189 | ● Master Agent Inactive | AIX 4.3.3 | 4.3.4.3.0 |
| slcdev045 | ✓ Available | Linux 2.4 | 2.4.24-9_eL2.7 smp #1 SMP Tue Aug ... |
| slcdevlab | ● No Master Agent | Windows 2000 | 5.0, Service Pack 3 |
| slcdev063 | ● Master Agent Inactive | Windows 2000 | 5.0, Service Pack 3 |
| slcdev64 | ✓ Available | Windows 2000 | 5.0, Service Pack 3 |
| slcdev102 | ● No products to upgrade | HP-UX B.11.00 | B.11.00, A |
| slcdev16 | ✓ Available | Linux 2.4 | 2.4.24-21-1384-49mL of Fri Oct 31 ... |
| slcdev142 | ✓ Available | Windows Server 2003 5.2 | |

↑ 401  ↑ 402  ↑ 403  ↑ 404

132-1

Click on table to select

[ Next ]   [ Cancel ]  [ Help ]

FIG. 8

Agent Patch Deployment

Agent Selection

A Software Patch is available for the installed agents listed below.
Agents may be excluded by unselecting the corresponding check boxes. You may not exclude agents requiring a patch.

| Host | Agent Name | Installed Version | New Version |
|---|---|---|---|
| locke069 | Host | 5.2.0.0.0 | 5.2.0.0.21 |
| locke142 | Host | 5.2.0.0.0 | 5.2.0.0.15 |

410, 411, 412, 413, 414

132-2

Back | Next | Cancel | Help

Click on table to select.

METHODS AND APPARATUS FOR INSTALLING AGENTS IN A MANAGED NETWORK

CONTINUATION IN PART APPLICATION

This application is a continuation in part of U.S. application entitled: "SYSTEM AND METHOD FOR INSTALLING ONE OR MORE COMPONENTS FOR A DATA STORAGE MANAGEMENT SYSTEM", Filed Dec. 31, 2002, having U.S. Ser. No. 10/335,650 now abandoned and sharing co-Inventorship herewith. The entire contents of application Ser. No. 10/335,650 is hereby incorporated by reference herein.

BACKGROUND

Modern computer networks allow the exchange of vast amounts of information between many computer systems. A requirement often exists to store this information within high-capacity data storage systems that can be interconnected with each other to form a type of network referred to as a storage area network. A typical storage area network includes one or more host computer systems, typically referred to as servers, which interconnect through a switching fabric (i.e., one or more storage area network switches) to a group of data storage systems to allow access to the stored data by those host computer systems (i.e., by the servers) on behalf of client computer systems (e.g., end user computers) that request such data. Due to the complexity of storage area networks, network managers (i.e., users responsible for managing resources in the storage area network) often utilize a storage area network management application to manage the configuration and operation of resources such as host computer systems, switches, data storage systems and associated software applications and hardware devices within the storage area network.

A typical conventional storage area network management application provides a management server and a console program that provides a graphical user interface that allows users to graphically manage the resources within the storage area network. The conventional management application (e.g., the management server) also interacts with a number of agent software processes (referred to simply as agents) that execute on various host computer systems operating within the storage area network in order to manage individual resources. The agents, which are generally also considered to be part of the network management application, execute on host computer systems to receive commands from management server to configure and control the various managed resources within the storage area network.

As an example, in a typical storage area network management application, developers have created (e.g., programmed) agents specifically to manage respective types of resources within the storage area network such as agents for managing hosts (i.e., host agents), agents to manage switches (i.e., switch agents), agents to manage data storage system (i.e., storage system agents), agents to manage software applications (e.g., database agents) and so forth. Each agent operates to periodically collect configuration data associated with resources managed by those agents for reporting back to the management server. Using the configuration data collected by the agents, the management server can display the current status and configuration of resources within the storage area network to the network manager on the graphical user interface of the console.

Within a typical conventional network management application such as a storage area network management application, a network manager is able to operate the management server to remotely install and configure the agents programs themselves for operation upon various host computer systems in the storage area network. The installation process of an agent in a conventional network management application allows the network manager to identify a specific agent for installation on a specific host computer system within the storage area network. The installation process then guides the network manager through the steps of installing the selected agent on the selected host. If the agent to be installed is replacing an agent already installed on that host (i.e., with a newer version of the agent), the installation process replaces the old agent version with the new agent version. Once properly installed, the network manager can cause the management server to instruct the newly installed agent to begin execution on that host.

SUMMARY

There are a variety of deficiencies associated with conventional mechanisms and techniques for installing agents for use within a network management application. In particular, conventional network management applications, such as storage area network management applications, do not provide an ability to perform installation of agents on a plurality of host computer systems at the same time (i.e., in an automated or bulk manner). Instead, for a network manager to install a conventional agent for operation on a host computer system in a conventional storage area network, the network manager is required to perform a cumbersome installation process from start to end for that agent for that host computer system. This process must be repeated for each agent and for each host computer system.

In network installations that include large numbers of agents and/or large numbers of host computer systems that execute many different agents, the individualized process of installing agents separately on each host computer system can consume large amounts of the network manager's time. As a specific example, suppose there are one hundred host computer systems that each execute various types of agents. When a developer of an agent releases a new version of the agent and distributes this new agent version to the network manager (e.g., via CD-ROM), in order to replace (i.e., patch) each of the existing agents on each host with the new version of the agent, the network manager must perform the installation process one hundred times to patch or replace the existing agent on each of the one hundred host computer systems. This can consume several days of a person's time. There is no ability for the network manager to identify the entire set of host computer systems upon which the agent is to be installed all at once and then to perform a single automated "bulk" agent installation operation that causes an automated installation of the agent and each of those host computer systems within the set.

Additionally, the conventional agent installation process replaces the entire existing agent with a new agent upon installation. This can be problematic if the network manager has made customizations in the configuration or operation of an existing agent on one or more of the many host computer systems that operate agents. In a conventional agent installation process, since the new agent installation completely replaces the existing agent installation, such customizations or configuration changes are lost. As a result, the individual installation of the new agent requires the network manager to re-perform the customizations that were made to the earlier version of the agents once the new version of the agent is installed on a host.

Additionally, when the new version of the agent becomes operable, certain portions of agent collected data that are stored within the network management application, such as historical data collected by the earlier version of the agent, may be inaccessible due to the use of the new agent. As a result, installation of a new agent using conventional installation techniques may result in the loss of resource management data collected or processed by the former version of the agent for a managed resource.

In contrast, embodiments of the invention significantly overcome the aforementioned disadvantages of conventional agent installation mechanisms and techniques used in conventional network management applications. In particular, configurations disclose herein provided an agent installer that operates in conjunction with a network management application that uses agents for management of resources. The agent installer provides mechanisms and techniques for installing one or more agents on a plurality of host computer systems in an automated and bulk manner so that the network manager does not have to individually install an agent on each and every host using a separate manual installation process for each agent for each host.

In operation, configurations of the agent installer disclosed herein identify at least one agent to be installed on a plurality of host computer systems. The identification of the agent to be installed on a group of computer systems can allow a user, for example, to select any number of host computer systems operating within the network. Based on a selection of the host computer systems, the agent installer is able to communicate with each of the host computer systems to identify what agents are presently installed on those host computer systems. As an example, suppose a user (e.g., a network manager) installs new agent code received from the agent vendor into a media repository associated with the storage area network management application (i.e., known to the agent installer). The user can operate the agent installer to select a group of hosts upon which that new agent code is to be installed. The agent installer can communicate with a master agent on each host to determine what agent and what agent versions are currently installed on those hosts. The master agent can reply with a list of the agents installed as well as the version numbers of those agents. The agent installer can then sort the data received from the master agent from each host to determine, based on what media repository agent versions exist versus what agents are currently installed on each host machine, those agents that can be patched with the new agent. The agent installer produces a list, for each host, of the current version of agents installed on those hosts and the available patch version of those agents in the media repository. The user can then choose which hosts and which agents on those hosts should be upgraded or patched with the new agents.

Once the hosts and agents have been selected, the agent installer then performs prerequisite checking of each of the selected host computer systems to determine which host computer system of the plurality of host computer systems are capable of supporting operation of the new agent(s). This can include performing, for example, cumulative pre-requisite disk space checking for each host to be patched with a new agent(s) to determine if sufficient disk space exists on those hosts to deploy the new agent code. Assuming prerequisite checking passed, the agent installer provides a summary to the user and the user can confirm the installation to be performed.

In one example configuration, after prerequisite checking and confirmation by the user, the agent installer creates and launches one task per host to perform the agent installation operations for that host. In general, the task for a particular host stops all agents on the host that are to be patched and again performs prerequisite checking for those agents to be sure the host is properly configured to support operation of the new agent. This prerequisite checking can include, for example, identifying any required third party software programs that might be required to be installed on the host to support operation of the new agent. If third party software is required but was not detected as being installed, the agent installer disclosed herein can bundle the required third party software with the agent code to be installed and the agent installer transfers the new agent installation package to the master agent executing on that host for installation of the agent (and any third party software that is supported required and available).

The master agent executing on each host receives the agent installation package and operates an installation script that moves the old agent code to a backup area prior to installing the new agent code. The master agent then un-packages any new agent files and places them into proper agent installation directories. Additionally, the installation script can avoid losing customized configurations associated with the old version of the agent by migrating configuration information from the backup area into the new version storage area for the new agent that is being installed in order to preserve the customized configuration information for use by the new version of the agent. Once the installation is complete on the host, the master agent indicates completion to the agent installer in the management application that then sends a command back to the master agent to start the new version of the agent.

The processing above can be repeated in an automated manner for each host computer system of the plurality of host computer systems that is capable of supporting operation of the agent. The system thus performs an automated bulk agent installation operation to install the agents on each host computer system and does not require further intervention by the user. During the installation process, the installation script provides detailed status of the installation back to the agent installer that is then displayed to the user so he or she can determine the current state of installation on many host computer systems. Variations on the aforementioned processing will be described in detail below.

It is to be understood that the system of the present application can be embodied solely as a software program, or as a software program operating in conjunction with corresponding hardware. For example, embodiments of the present application may be implemented in EMC's Control Center (ECC) software application that provides graphical management functionality of storage area network resources. Embodiments of the present application may also be implemented in computer devices that operate the Control Center (ECC) software. Control Center software is manufactured by EMC Corporation of Hopkinton, Mass., USA.

Other examples of the configurations disclosed herein include a computer system (e.g., a host computer, workstation, etc.) configured to support the aforementioned operations disclosed herein. In such embodiments, the computer system includes a display, a memory system, a processor (e.g., a processing device) and an interconnect. The interconnect supports communications among the display, the processor and the memory system. The memory system is encoded with an agent installer application that, when executed on the processor, produces a agent installer process supporting the embodiments and processing discussed above and disclosed elsewhere herein.

Yet other embodiments of the present application disclosed herein include software programs to perform the methods and operations summarized above and disclosed in detail below under the heading Detailed Description. More particularly, a computer program product (e.g., a computer-readable medium) including computer program logic encoded thereon may be executed on a computer device to support agent installation server and host operations as explained herein. The computer program logic, when executed on at least one processor of a corresponding computing system, causes the processor to perform the operations (e.g., the methods) indicated herein as embodiments of the present application. Such arrangements of the present application are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed on a computer device to cause one or more processors in the computerized device to perform the techniques explained herein. Software processes that operate in a collection of computer devices, such as in a group of storage area network management servers or hosts or management stations can also support embodiments of the present application.

BRIEF DESCRIPTION OF THE DRAWINGS

The foregoing and other objects, features and advantages of the present application will be apparent from the following more particular description of preferred embodiments, as illustrated in the accompanying drawings in which like reference characters refer to the same parts throughout the different views. The drawings are not necessarily to scale, with emphasis instead being placed upon illustrating example embodiments, principles and concepts.

FIGS. 8 through 11 show example screenshots of an agent installer.

DETAILED DESCRIPTION

Figure 1:
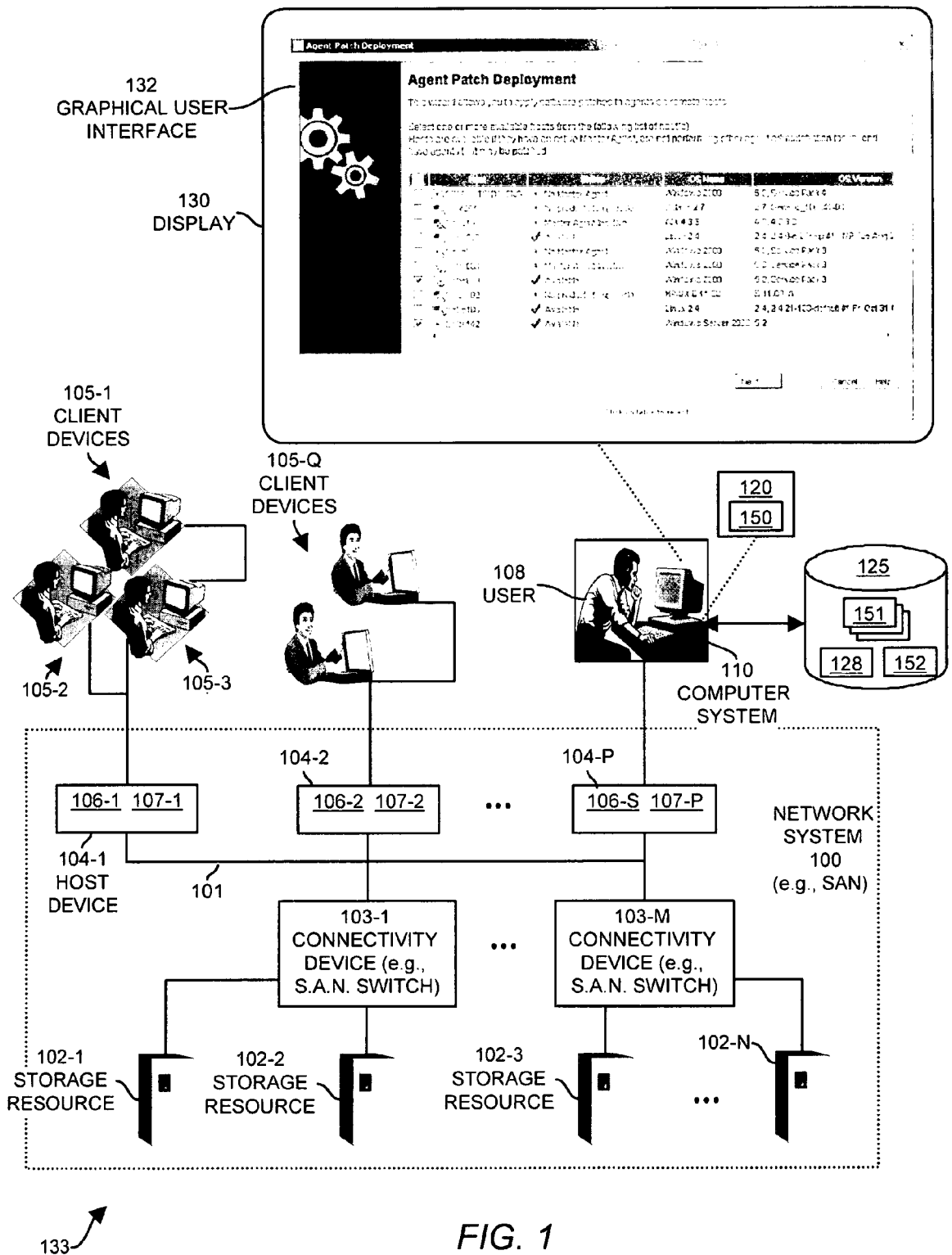
FIG. 1 is a pictorial diagram of a storage area network and corresponding management station configured to operate according to an embodiment of the present application.

FIG. 1 illustrates a storage area network environment 133 suitable for use in explaining example operations of embodiments disclosed herein. As shown, a network system 100 such as a storage area network includes a network medium 101 such as a high-speed data communications medium (e.g., Ethernet, optical network, or other type of network) that interconnects a plurality of resources such as storage resources 102-1, 102-2, . . . , 102-N (collectively, storage resources 102), network switches 103-1, . . . 103-M (collectively, network switches 103 such as storage area network switches), host computer systems 104-1 (e.g. servers), 104-2 . . . , 104-P (collectively, host computer systems 104), client devices 105-1, 105-2, . . . , 105-S (collectively, client devices 105), and a management computer system 110 (e.g., a storage area network management station). Each host computer system in this storage area network example operates one or more agents 106-1 through 106-S. When installed and operational within the host computer systems 104, the agents 106 (of which a host may execute more than one) interact with the resources 102 through 104 to manage these resources under the control of a network management application 120 operating in the host computer system.

The computer system 110 operates (e.g. executes) the network management application 120 and further includes a display 130 and a media repository 125. The network management application 120 displays a graphical user interface 132 (e.g., a software graphical user interface application more particularly shown in FIG. 2) on the display 130 to generate and display information in accordance with embodiments explained herein. The network management application is configured with an agent installer 150 that operates as explained herein to perform bulk installations/patches of agents 106 within the host computer systems 104. The computer system 110 further includes, or has access to, a media repository 125 that stores agents 151 (i.e., as agent installation packages) that the agent installer 150 can install as agents 106 onto the host computer systems 104. In this example, the media repository maintains certain third party software programs 127 that may be required on host computer systems 104 during operation of certain agents 151. Also in this example, the media repository maintains pre-requisite checking scripts 128 that can perform pre-requisite checking of the host computer systems 104 prior to installation of the agent packages 151.

In the example shown, the computer system 110 is configured as a storage area network management station operated by a user 108 such as a network manager responsible that the user 108 uses for managing resources (e.g., 102 through 104) associated with the storage area network 100. The network management application 120 in this example may be any type of network management software application that executes, performs or otherwise operates within the management station computerized device 110. It should be noted that computer system 110 may include certain other components such as one or more internal devices as well as software applications or processes (e.g., an operating system) that operate within or in conjunction with the illustrated components and devices in FIG. 1.

As shown towards the top of FIG. 1, the agent installer 150, operating in this example as part of the management application 120 on the computer system 110, displays a graphical user interface 132 on the display 130 that allows the user 108 to provide input commands to control the process of performing bulk agent installations. Details of this graphical user interface 132 and the operation of the agent installer 150 will now be provided in a more detailed view of the graphical user interface 132 shown in FIG. 2.

Figure 2:
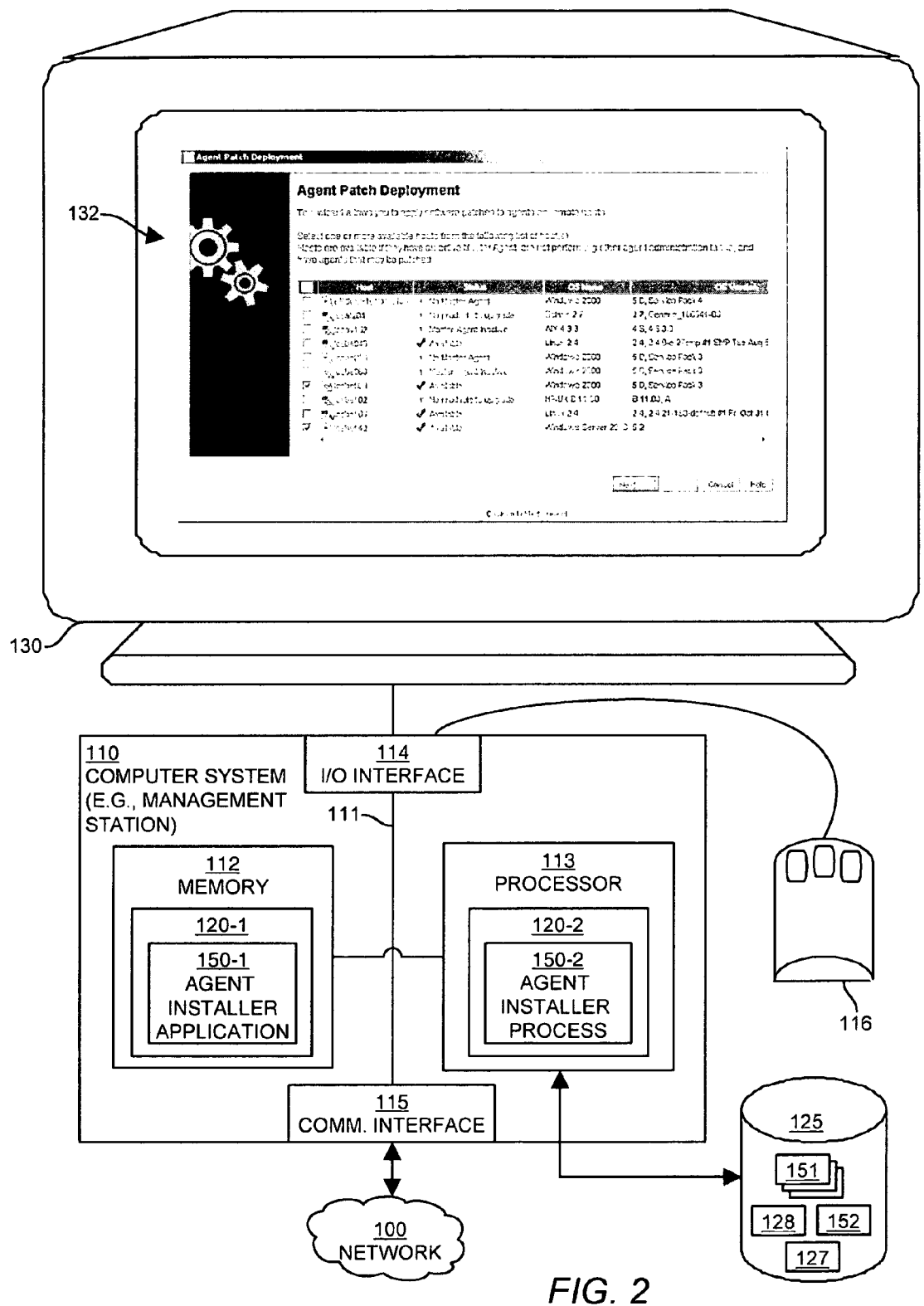
FIG. 2 is a block diagram of a sample architecture associated with the computer system management station for executing a resource manager application to generate a graphical user interface according to an embodiment of the present application.

FIG. 2 is a block diagram illustrating an example architecture of computer system 110 (e.g., a storage area network management station) in accordance with one example configuration. The computer system 110 may be any type of computerized device such as a personal computer, workstation, portable computing device, console, laptop computer, network terminal or the like. As shown, the computer system 110 of the present example includes an interconnection mechanism 111 that couples a memory system 112, a processor 113, an input/output interface 114, and a communications interface 115. A peripheral device 116 (e.g., one or more viewer controlled devices such as a keyboard, mouse, etc.) couples to the processor 113 through the I/O interface 114 and enables the user 108 to provide input commands and thus generally control bulk agent installation operations and view installation status of the agent installer 150 on the graphical user interface 132. The media repository stores agents 151 (i.e., new agent installation packages) that can be installed onto the host computer systems 104 as operating agents 106. In this example, the media repository also maintains certain third party software programs 127 that may be required on host computer systems 104 during operation of certain agents 151. Also in this example, the media repository maintains pre-requisite checking scripts 128 that can perform pre-requisite checking of the host computer systems 104 prior to installation of the agent packages 151. The communications interface 115 enables the computer system 110 (and the corresponding user 108) to communicate with other devices (i.e., resources) associated with the network 100, that is a storage area network in this example.

As shown, the memory system 112 is encoded with a network management application 120-1 that includes an agent installer 150 that supports bulk agent installation as explained herein. The network management application 120-1 may be embodied as software code such as data and/or logic instructions (e.g., code stored in the memory or on another computer readable medium such as a disk) that supports agent installer 150 processing functionality according to different embodiments described herein. During operation, the processor 113 accesses the memory system 112 via the interconnect 111 in order to launch, run, execute, interpret or otherwise perform the logic instructions of the network management application 120-1. Execution of network management application 120-1 produces the network management process 120-2 that includes functionality of the agent installer 150. In other words, the network management process 120-2 including the agent installer process 150-2 represents one or more portions of the network management application 120-1 (or the entire application 120-1), including the agent installer application 150-1, performing within or upon the processor 113 in the computerized device 110. Note that in an alternative configuration, the agent installer application 150-1 and process 150-2 can be configured and operate separately from the network management application 120-1 and process 120-2, such as a standalone agent installer 150.

It should be noted that the network management manager 120 and the agent installer 150 executed in the computer system 110 is represented in FIG. 2 by either one or both of the network management application 120-1 and/or the network management process 120-2. For purposes of this discussion, general reference will be made to the network management application 120 and the agent installer 150 as performing or supporting the various steps and functional operations to carry out techniques discussed herein. It should also be noted that example configurations herein include the agent installer 150 itself (i.e., the un-executed or non-performing logic instructions and/or data). The agent installer 150 may be stored on a computer readable medium (such as a floppy disk), hard disk, or optical medium and may be part of or separate from the network management application 120. The agent installer 150 may also be stored in a computer readable medium such as the memory system 112 that may be firmware, read only memory (ROM), or, as in this example, as executable code in, for example, Random Access Memory (RAM). In addition to these embodiments, it should also be noted that other embodiments herein include the execution of resource manager application 120-1 in processor 113 as the resource manager process 120-2 that each include the agent installer 150, or the agent installer 150 itself may exist as an application in memory 112 or as a process on the processor 113.

Thus, those skilled in the art will understand that the computer system 110 may include other processes and/or software and hardware components, such as an operating system. The display 130 need not be coupled directly to the computer system 110. For example, the network management application 120 can be executed on a remotely accessible computerized device. In this instance, the graphical user interface 132 may be displayed locally to the user 108 via a console process, while the network management process 120 including the agent installer 150 is executed remotely. Further operational details of the network management application and process including the agent installer 150 will now be provided with respect to flow charts of processing steps and more detailed screen shots of the graphical user interface 132.

Figure 3:
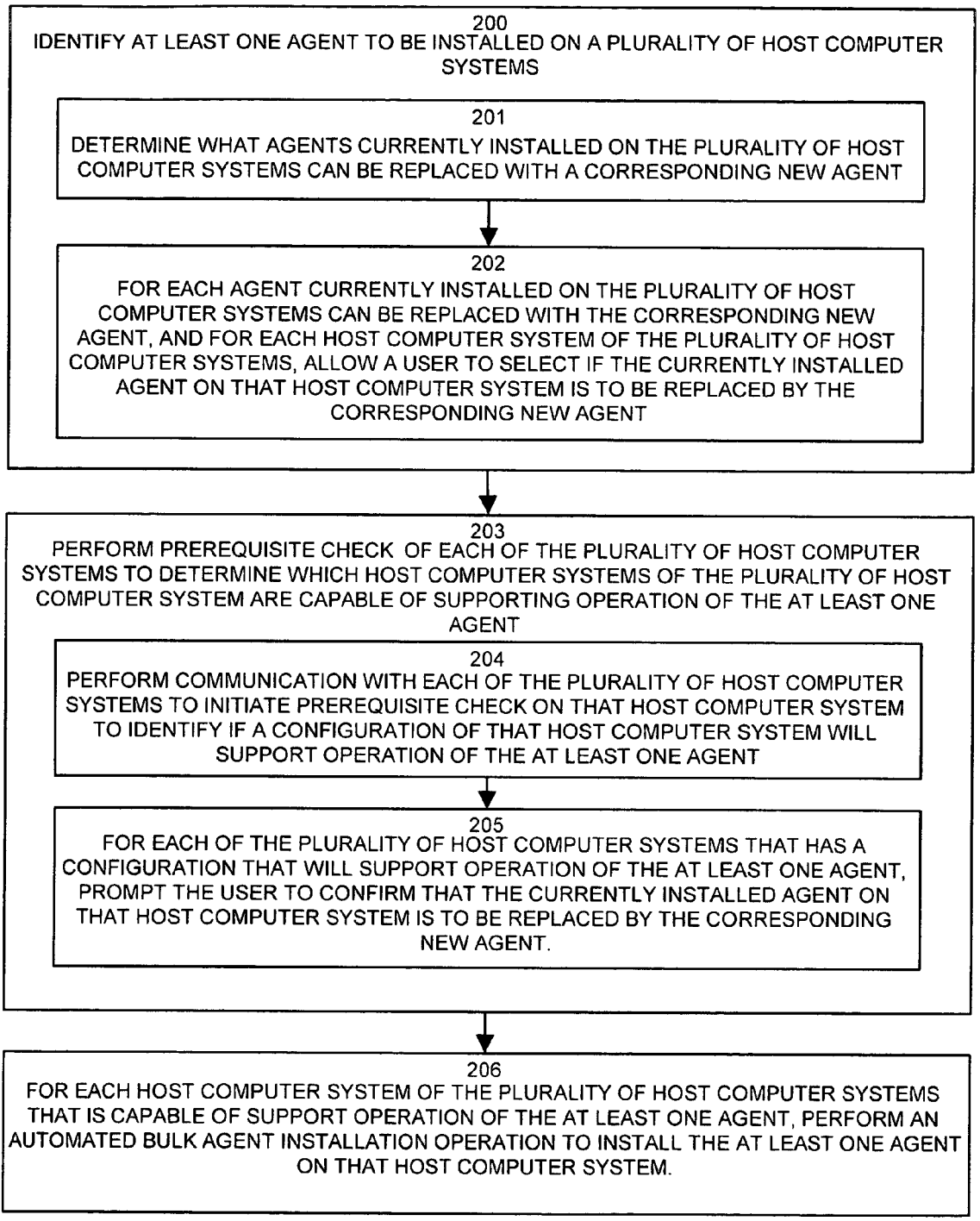
FIG. 3 is a flow chart of high-level processing steps performed by an agent installer configured in accordance with embodiments disclosed herein.

FIG. 3 is a flow chart of processing steps that an agent installer application and/or process 150 perform within the storage area network management application 120 that operates using agents 106 for management of resources 102 through 104 in the storage area network 100 in accordance with one example embodiment.

In step 200, the agent installer 150 identifies at least one agent 151 to be installed on a plurality of host computer systems 104. Details of identification of one or more agents 151 for automated installation on one or more host computer systems 104 will be explained more fully with respect to the flow chart of processing steps and FIG. 4. Generally however, the user 108 is able to select identities of one or more host computer systems 104 listed in a host selection area 401 as shown in the example graphical user interface 132-1 in FIG. 8.

Directing attention briefly to FIG. 8, the agent installer 150 displays the graphical user interface 132-1 within the display 130 that lists various host computer systems 104 for selection in the host selection area 401. The agent installer 150 also lists a status 402 as well as an operating system name 403 and an operating system version 404 associated with the each host computer system 104. The status 402 indicates to the user 108 if a particular host computer system 104 is available for installation of a patch to any existing agents 106 that are already installed on that host computer system 104. Additionally, the status 402 indicates whether or not a master agent 107 is present on that host computer system 104. In this example configuration, a master agent 107 is an agent that coordinates with the agent installer 150 to perform installation of specific agents 106 that manage resources 102 through 104 within the storage area network 100 as will be explained shortly.

Returning attention back to the flow chart of processing steps in FIG. 3, in step 201, the agent installer 150 determines what agents 106 that are currently installed on the plurality of host computer systems 104 can be replaced with a corresponding new agent 151.

In step 202, for each agent 106 currently installed on the host computer systems 104 that can be replaced with a corresponding new agent 151, and for each host computer system 104, the agent installer 150 allows a user 108 to select if the currently installed agent 106 on that host computer system 104 is to be replaced by the corresponding new agent 151. The agent installer 150 thus allows the user 108 to choose, via the graphical user interface 132, which currently installed agents 106 on the host computer systems 104 are to be replaced by corresponding new agents 151. The user 108 can select some agents for replacement, while the user might not select other currently installed agent(s) 106 on those host computer systems 104 for replacement by any new agent 151. This processing is generally illustrated in the graphical user interface 132-2 shown in FIG. 9 and occurs after the user selects one or more host agents 104 from the interface 132-1 FIG. 8.

Directing attention briefly FIG. 9, the agent installer 150 displays the graphical user interface 132-2 that shows a list of host identities selected by the user 108 from the host selection area 401 in FIG. 8 that are to be patched with new agents 151 stored in the media repository 125. For each host listed in the host identity column 410, an agent identity column 411 identifies any agents 106 currently operating on that host 104 and an installed version column 412 lists the current versions of those agents 106 (operating on that host 104) and the new version column 413 indicates the new version of the agent available as an agent installation package 151 within the media repository 125. When the agent installer 150 presents the graphical user interface 132-2 to the user 108, the user 108 is able to select 414 particular host(s) and agent(s) that are to be patched with a corresponding new version of the agent 151 from the media repository 125. In the illustrated example, the user 108 has selected two hosts that each are currently executing a host agent that is to be patched with a new version of that host agent 151 that has been loaded into the media repository 125.

It is to be understood that this example illustrates the selection of two hosts only and that the agent installer 150 can display and allow the selection of any number of hosts and corresponding agents within the graphical user interface 132-1 and 132-2.

In step 203, the agent installer 150 performs prerequisite checking of each of the plurality of host computer systems 104 (i.e., those selected by the user 108 in the aforementioned example graphical user interfaces 132) to determine which host computer systems 104 of the plurality of host computer system are capable of supporting operation of the at least one agent 151. In other words, for each host computer system 104 that the user has selected for installation of an agent, the agent installer 150 can perform prerequisite checking to be sure that host is capable of supporting operation of the new version of the agent.

In step 204, the agent installer 150 performs communication with each of the plurality of host computer systems 104 to initiate prerequisite checking on that host computer system to identify if a configuration of that host computer system will support operation of the agent(s) 151. As an example, the agent installer 150 can send a prerequisite checking script 152 (stored in this example in the media repository) to each remote host 104 to cause each of the host computer systems 104 to perform cumulative disk space checking on that host computer system 104 to determine if enough disk space is available to support operation of the agent 151 to be installed on that host 104.

Figure 10:
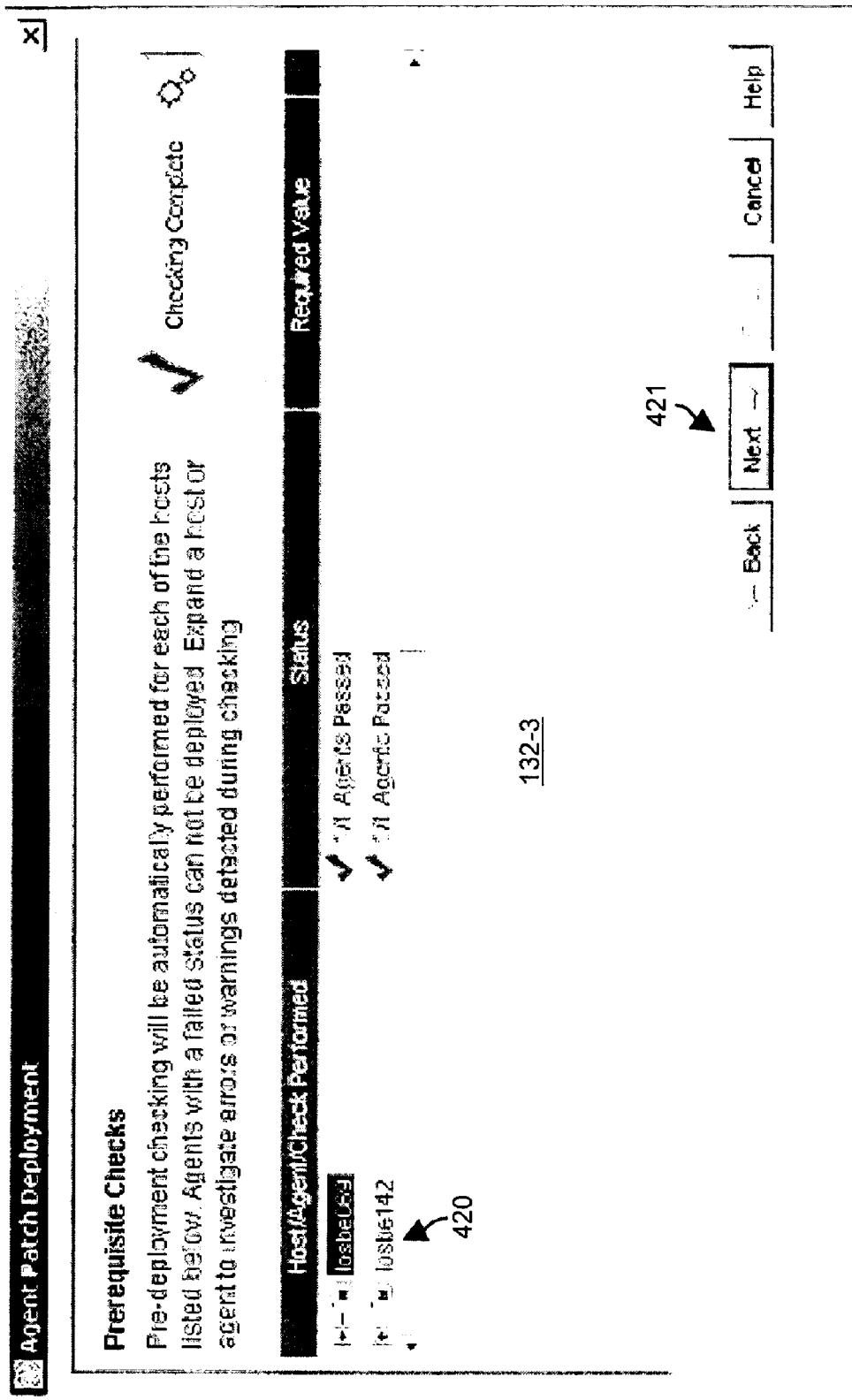

Directing attention briefly to graphical user interface 132-3 shown in FIG. 10, the agent installer 150 indicates to the user a list 420 of each host computer system that will be prerequisite checked for proper configuration to support operation of the agent 151 to be installed. By clicking next 421, the user 108 initiates prerequisite checking on each host in an automated manner. This avoids the user 108 having to perform prerequisite checking manually for each host computer system 104.

Figure 11:
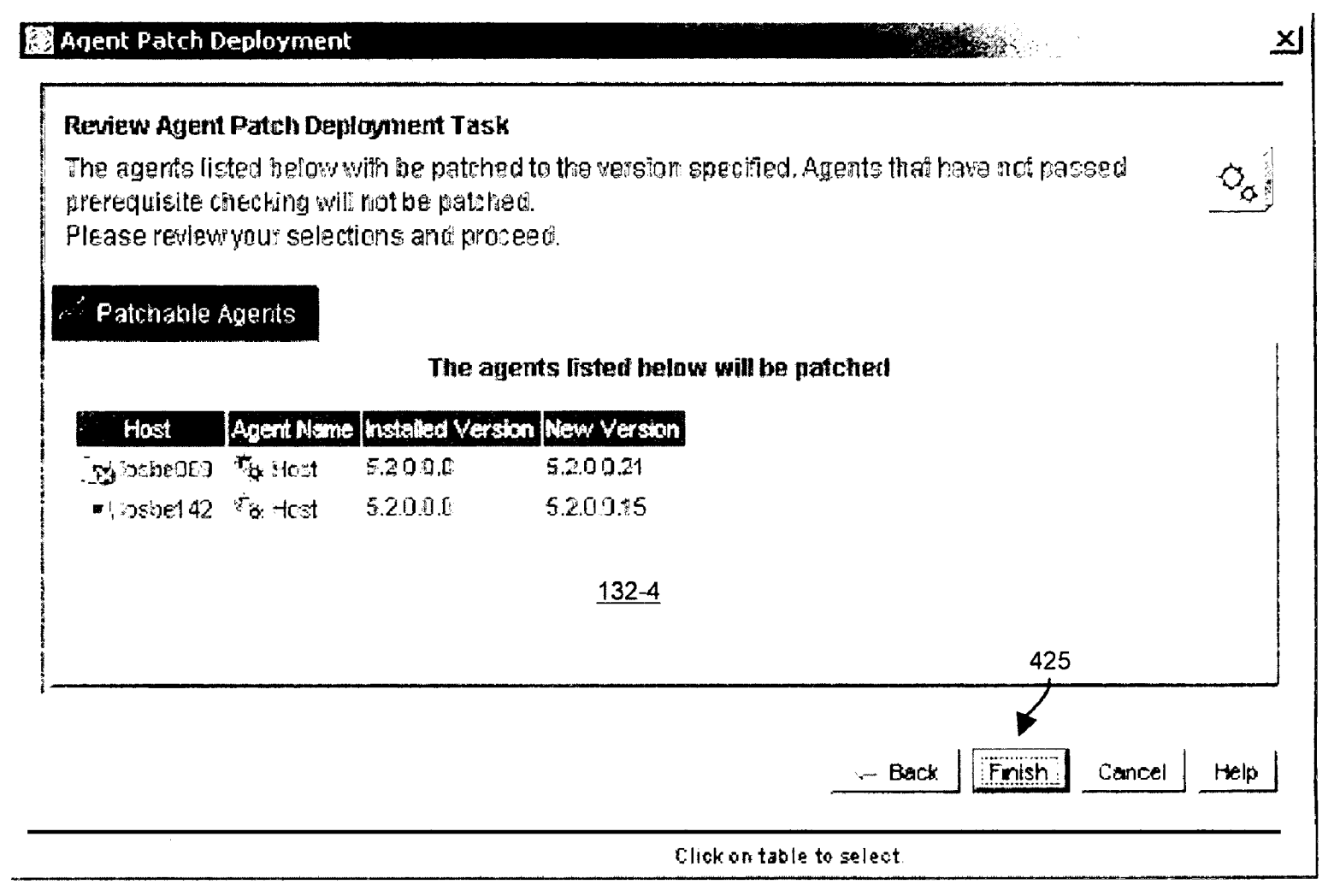

In step 205, once prerequisite checking is complete, for each of the plurality of host computer systems 104 that has a configuration that will support operation of the agent(s) 151, the agent installer 150 prompts the user to confirm that the currently installed agent 106 on that host computer system is to be replaced by the corresponding new agent 151. This is illustrated in the graphical user interface 132 shown in FIG. 11 that allows the user to confirm the installation process to be performed by clicking the finish buttoned 425.

In step 206, for each host computer system 104 of the plurality of host computer systems that is capable of supporting operation of the agent(s) 151, the agent installer 150 performs an automated bulk agent installation operation to install the agent(s) 151 on those host computer systems 104. Further details of the high-level operations of this agent installation process will now be provided with respect to the flow chart of processing steps shown in FIGS. 4 through 7.

Figure 4:
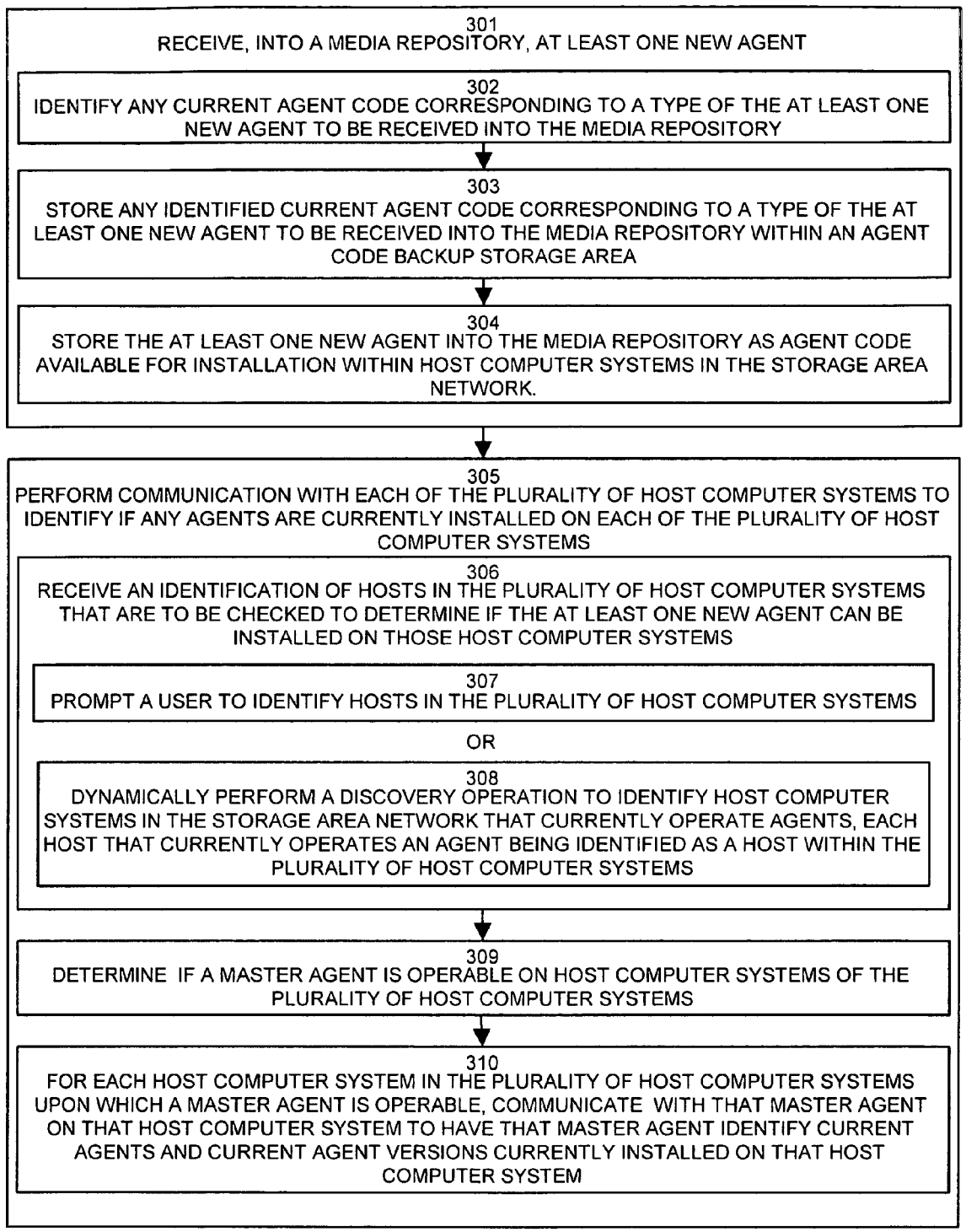
FIGS. 4 through 7 are a continuous flow chart of detailed processing steps that an agent installer performs according to various configurations disclosed herein.

FIGS. 4 through 7 are a continuous flow chart of processing steps that show details of various configurations of the operation of the agent installer 150 as disclosed herein. In FIG. 4, processing begins with details of how the agent installer 150 identifies at least one agent 151 to be installed on a plurality of host computer systems 104.

In step 301, the agent installer 150 receives, into a media repository 125, at least one new agent 151. The user 108 can supply the new agent code 151 via CD-ROM or from a remote network server (not shown). Sub-steps 302 through 304 show details of this processing.

In step 302, the agent installer 150 identifies any current agent code (i.e., agent packages 151) corresponding to a type of the new agent 151 to be received into the media repository 125.

In step 303, the agent installer 150 stores (i.e., backs up) any identified current agent code corresponding to a type of the new agent 151 to be received into the media repository 125 within an agent code backup storage area in the media repository. This creates a backup of the agent installation packages 151 of any currently installed agents 106.

In step 304, the agent installer 150 stores the new agent(s) 151 into the media repository 125 as agent code available for installation within host computer systems 104 in the storage area network 100.

Next, in step 305, the agent installer 150 performs communication with each host computer system 104 to identify if any agents 106 are currently installed on each of the host computer systems 104. Details of the processing are illustrated in steps 306 through 310.

In step 306, the agent installer 150 receives an identification of hosts 104 that are to be checked to determine if the new agent(s) 151 can be installed on those host computer systems. Steps 307 and 308 illustrate to example alternatives for identifying or discovering which host computer systems can be patched with new agents 151 installed into the media repository 125.

In sub-step 307, the agent installer 150 prompts a user to identify those hosts 104. In this example the user 108 provides the identity of those host computer systems that can support operation of the agent 151.

Alternatively, in step 308, the agent installer 150 dynamically performs a discovery operation to identify host computer systems 104 in the storage area network that currently operate agents 106 that correspond to the agents 151 installed into the media repository 125. In this configuration, the agent installer 150 is able to automatically discover which host computer systems can be upgraded or patched with any available agent packages 151 installed into the media repository 125.

Next, in step 309, the agent installer 150 determines if a master agent 107 is operable on host computer systems 104 of the plurality of host computer systems. As briefly noted above, a master agent 107 is used in this configuration on each host 104 to interoperate with the agent installer 150 to assist in performing agent installation.

In step 310, for each host computer system 104 upon which a master agent 107 is operable, the agent installer 150 communicates with that master agent 107 on that host computer system 104 to have that master agent 107 identify current agents 106 and current agent versions currently installed on that host computer system 104. Note that in one configuration, step 310 can be a sub-step of step 308 or 309.

Figure 5:
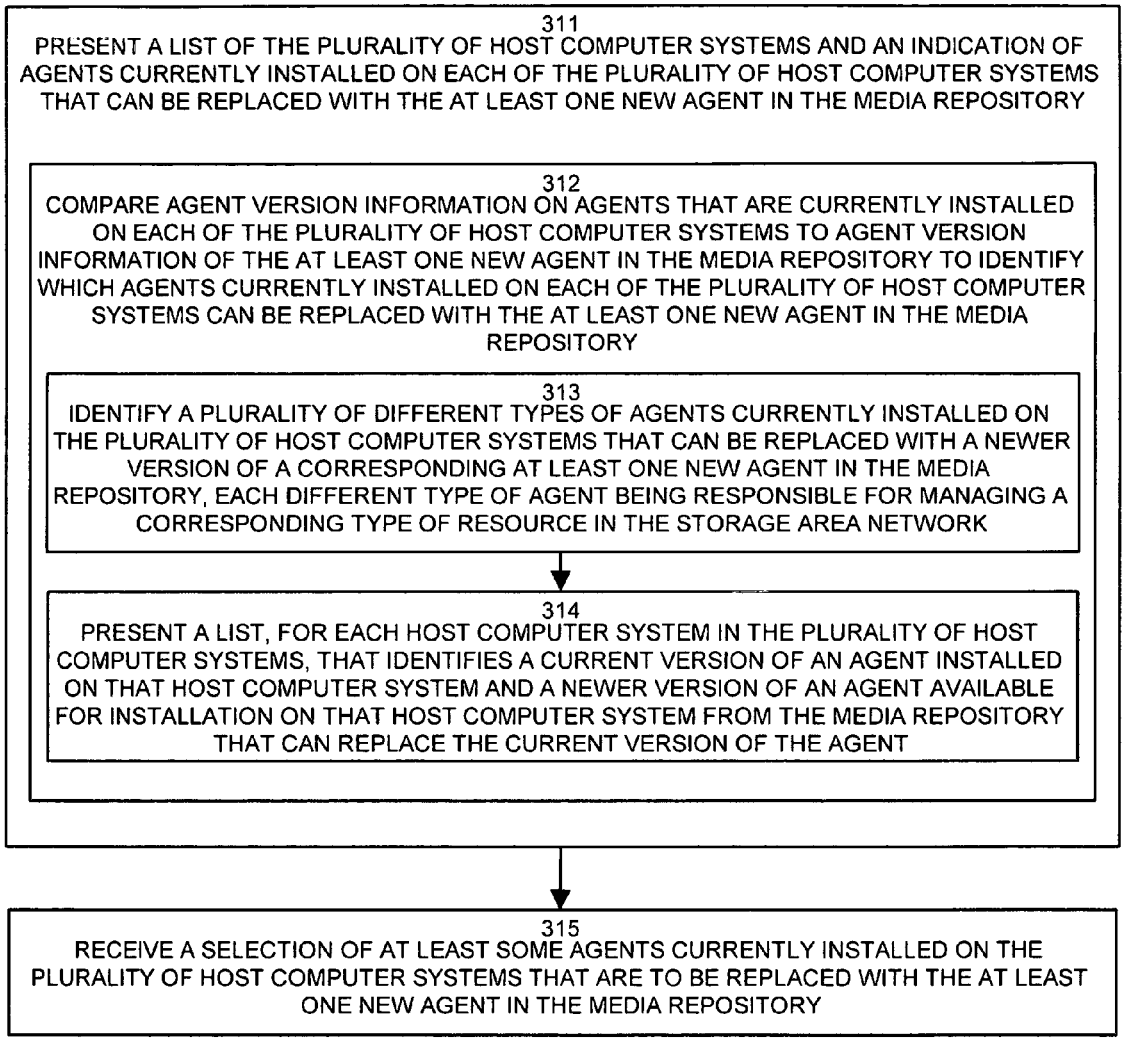

FIG. 5 is a flow chart that continues the processing steps from the flow chart in FIG. 4.

In step 311 in FIG. 5, the agent installer 150 presents a list of the plurality of host computer systems 104 and an indication of agents 106 currently installed on each of the plurality of host computer systems 104 that can be replaced with the at least one new agent 151 in the media repository 125. This was discussed above in the example graphical user interface 132-1 in FIG. 8. Sub-steps 312 through 314 in FIG. 5 illustrate example details of the processing.

In step 312, the agent installer 150 compares agent version information on agents 106 that are currently installed on each of the host computer systems 104 to agent version information of the new agents 151 in the media repository 125 to identify which agents 106 currently installed on each of the host computer systems 104 can be replaced with the new agent(s) 151 in the media repository 125. Sub-step 313 illustrates a configuration that can identify different agents for bulk installation.

In step 313, the agent installer 150 identifies a plurality of different types of agents 151 currently installed on the host computer systems 104 that can be replaced with a newer version of a corresponding new agent 151 in the media repository. Each different type of agent is responsible for managing a corresponding type of resource in the storage area network 100. In this manner, embodiments disclosed herein are able to install many different types of agents on multiple host computer systems in automated manner.

In step 314, the agent installer 150 presents a list, for each host computer system, that identifies a current version of an agent 106 installed on that host computer system and a newer version of an agent 151 available for installation on that host computer system 104 from the media repository 125 that can replace the current version of the agent 106. At this point, the user is thus presented with a list of the agents 106 currently installed on various host computer systems 104 that can be upgraded to the newer version of the agent 151.

In step 315, the agent installer 150 receives a selection of at least some agents currently installed on the plurality of host computer systems 104 that are to be replaced with the at least one new agent 151 in the media repository. The selection mechanism was briefly discussed above with respect to the graphical user interfaces 132 in FIGS. 9 through 11. Once the user has completed his or her selections, the remainder of the installation process does not require significant interaction by the user, but rather, the agent installer 150 performs an automated bulk installation process of each new agent 151 on each host 104 selected by the user.

Figure 6:
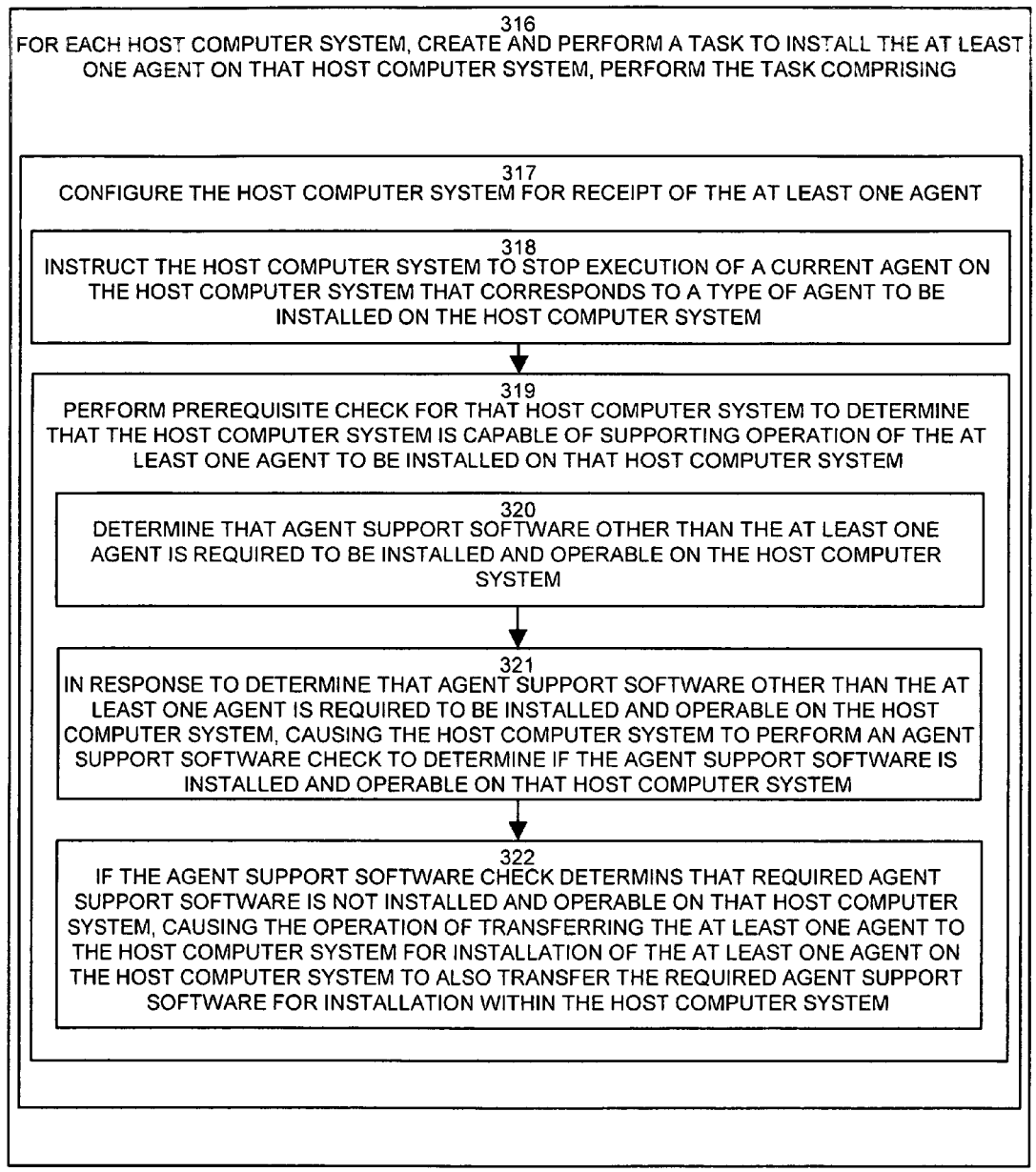

FIG. 6 is a flow chart that continues the processing steps from the flow chart in FIG. 5 and performs processing for each host computer system 104 that is capable of supporting operation of an agent 151. The processing remaining in FIGS. 6 and 7 performs the automated bulk agent installation operation to install the selected agents 151 on those host computer systems 104.

In step 316, for each host computer system, the agent installer 150 creates and performs a task to install the agent(s) on that host computer system. This processing is shown by the remaining steps in the flow charts in FIGS. 6 and 7.

In step 317, the agent installer 150 configures the host computer system for receipt of the agent(s) 151. Configuring a host computer system 104 is illustrated by the processing in sub-steps 318 through 322.

In step 318, the agent installer 150 instructs the host computer system to stop execution of a current agent 106 on the host computer system 104. This halts operation of the agent 106 that corresponds to a type of agent to be installed on the host computer system 104.

In step 319, the agent installer 150 performs prerequisite checking (again) for that host computer system to determine that the host computer system is capable of supporting operation of the agent 151 to be installed on that host computer system 104. This ensures that the configuration of the host computer system 104 has not changed since the time the user selected that host computer system for installation of the new agent 151. Steps 320 through 322 show details of processing of this prerequisite checking in accordance with one example configuration disclosed herein.

In step 320, the agent installer 150 determines that agent support software 127 other than the agent 151 is required to be installed and operable on the host computer system 104. As an example, the agent installer 150 may examine the new agent installation package 151 to determine that third party software may be required to be installed on the host computer system 104 in order for the new agent 151 to properly operate. If this is the case the host 104 must be checked to see if this software is operational.

In step 321, in response to determining that agent support software 127 other than the new agent 151 is required to be installed and operable on the host computer system 104, the agent installer 150 causes the host computer system 104 to perform an agent support software check to determine if the agent support software 127 is installed and operable on that host computer system 104. This can be accomplished by sending an prerequisite checking script 152 to the host 104 that executes and reports back to the agent installer 150 if the agent support software is available on that host 104.

In step 322, if the agent support software check determines that required agent support software is not installed and operable on that host computer system, that agent installer 150 in one configuration causes the operation of transferring the agent 151 to the host computer system (to be explained shortly) to also transfer the required agent support software for installation within the host computer system as well. In this manner, one configuration disclosed herein is able to identify other software that may be required for proper agent operation of a host 104 and if that software is available, causes the installation of that software as well as the agent on that host 104.

Figure 7:
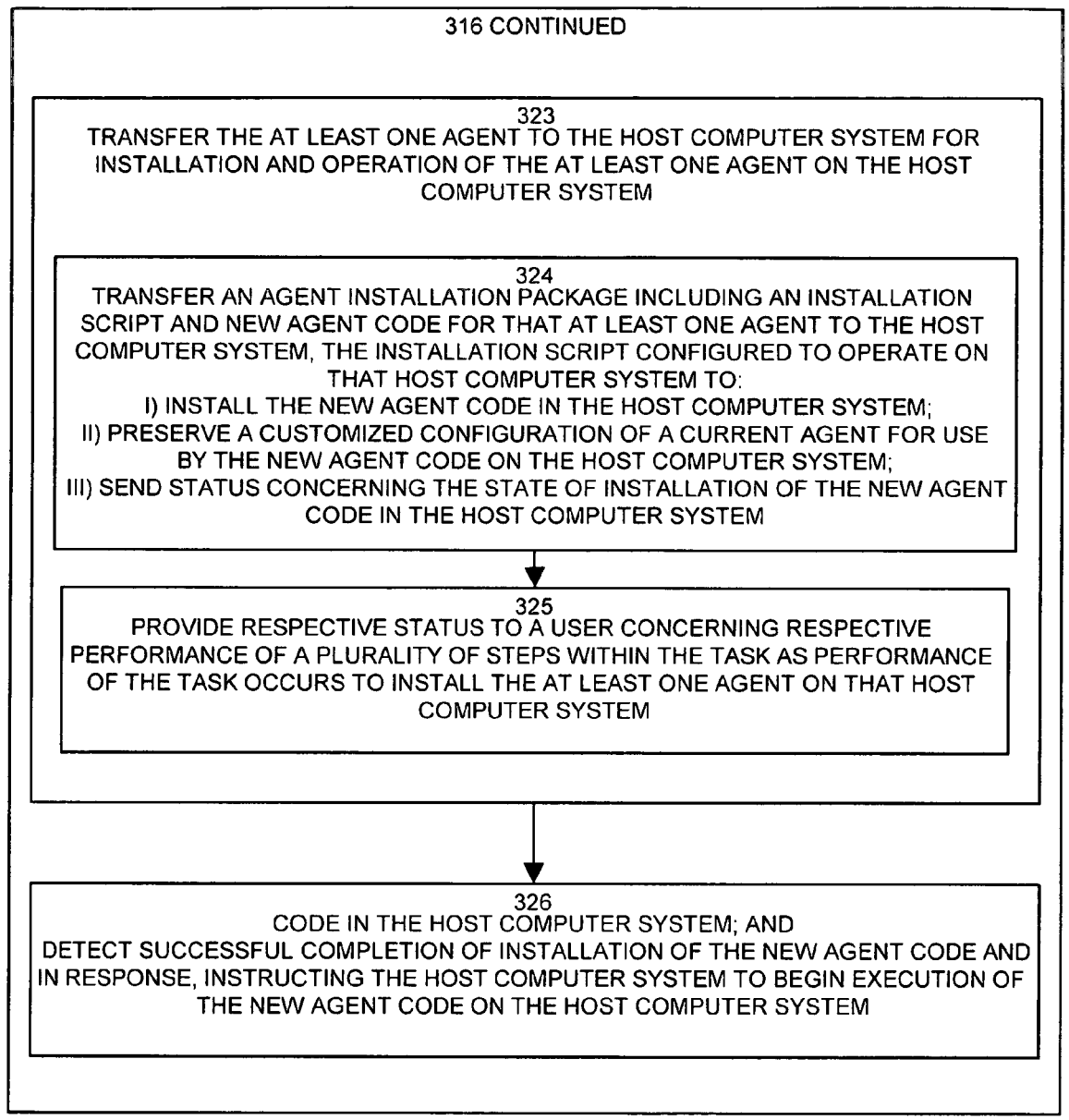

FIG. 7 is a flow chart that continues the processing steps from the flow chart in FIG. 6.

In step 323 in FIG. 7, the agent installer 150 transfers the agent (and any support software, if available and required) to the host computer system 104 for installation and operation of the agent 151 on the host computer system 104. Sub-steps 324 and 325 should details of this processing.

In sub-step 324, the agent installer 150 transfers an agent installation package 151 that includes an installation script and new agent code for that new agent to the host computer system 104. In one example configuration, the installation script is configured to operate on that host computer system 104 to: i) install the new agent code in the host computer system 104; ii) preserve any customized configuration of a current agent 106 for use by the new agent code 151 on the host computer system 104; and iii) send status concerning the state of installation of the new agent code 151 in the host computer system 104 back to the agent installer 150 for display on the graphical user interface 132. Accordingly, the agent installation script within the new agent package 151 performs all required installation operations in an automated manner, without requiring user interaction. This script may be a Perl programming language script, for example. Depending upon the configuration, the installation script can send a log file back to the agent installer 150 that conveys the state of the installation of the agent 151 as an operating agent 106, or the installation script can send real-time status messages.

In step 325$_{[z2]}$ the agent installer 150 provides respective status to the user 108 (i.e., via the graphical user interface) concerning respective performance of steps within the task as performance of the task occurs to install the agent 151/106 on that host computer system 104. In this manner, the user 108 is aware of the state of the installation. Providing respective status to the user can include status messages such as a confirmation of completion of stopping execution of the current agent, a confirmation of completion of backing up the agent, a confirmation of completion of saving any customized configuration of the current agent and a confirmation of completion of installation of the new agent. Others status information can be provided as well, and not all status information must be provided. In other configurations, the agent installer 150 can send status messages, before and after the execution of the installation script as well as receive a log file from the installation script.

In step 326, the agent installer 150 detects successful completion of installation of the new agent code and in response, instructs the host computer system 104 to begin execution of the new agent code on the host computer system.

In this manner, configurations disclosed above provide an automated bulk agent installation process that can be used, for example, to patch existing agent code in host computer systems or for the installation of new agent code. By allowing the user to select many different host computer systems and different agents for installation, the user does not have to perform the installation process for each agent using a manual process on each host separately. Additionally, since customized configurations of an existing agent can be copied and maintained for use by the new agent, the new agent maintains any customized configurations that the user 108 may have performed. This also allows management data such as performance history of resources that has been collected by the former agent to be used by the new agent and thus such data is not lost when an agent is upgraded to a newer version.

What is claimed is:

1. In a storage area network management application that operates using agents for management of resources, a method for installing an agent on a plurality of host computer systems in the storage area network, the method comprising:

in a storage area network, identifying at least one agent to be installed on a plurality of host computer systems, wherein said storage area network includes one or more servers which interconnect through a switching fabric to a group of data storage systems to allow access to the stored data by said servers on behalf of client computer systems that request such data, and wherein said at least one agent executes on host computer systems to receive commands from a management server to configure and control various managed resources within the storage area network;

performing prerequisite checking of each of the plurality of host computer systems to determine which host computer systems of the plurality of host computer system are capable of supporting operation of the at least one agent; and for each host computer system of the plurality of host computer systems that is capable of supporting operation of the at least one agent, performing an automated bulk agent installation operation to install the at least one agent on that host computer system.

2. The method of claim 1 wherein identifying at least one agent to be installed on a plurality of host computer systems comprises:

determining what agents currently installed on the plurality of host computer systems can be replaced with a corresponding new agent; and for each agent currently installed on the plurality of host computer systems that can be replaced with the corresponding new agent, and for each host computer system of the plurality of host computer systems, allowing a user to select if the currently installed agent on that host computer system is to be replaced by the corresponding new agent.

3. The method of claim 2 wherein identifying at least one agent to be installed on a plurality of host computer systems comprises:

receiving, into a media repository, at least one new agent;

performing communication with each of the plurality of host computer systems to identify if any agents are currently installed on each of the plurality of host computer systems;

presenting a list of the plurality of host computer systems and an indication of agents currently installed on each of the plurality of host computer systems that can be replaced with the at least one new agent in the media repository; and receiving a selection of at least some agents currently installed on the plurality of host computer systems that are to be replaced with the at least one new agent in the media repository.

4. The method of claim 3 wherein receiving, into a media repository, at least one new agent comprises:

identifying any current agent code corresponding to a type of the at least one new agent to be received into the media repository;

storing any identified current agent code corresponding to a type of the at least one new agent to be received into the media repository within an agent code backup storage area; and storing the at least one new agent into the media repository as agent code available for installation within host computer systems in the storage area network.

5. The method of claim 3 wherein performing communication with each of the plurality of host computer systems to identify if any agents are currently installed on each of the plurality of host computer systems comprises:

receiving an identification of hosts in the plurality of host computer systems that are to be checked to determine if the at least one new agent can be installed on those host computer systems;

determining if a master agent is operable on host computer systems of the plurality of host computer systems; and for each host computer system in the plurality of host computer systems upon which a master agent is operable, communicating with that master agent on that host computer system to have that master agent identify current agents and current agent versions currently installed on that host computer system.

6. The method of claim 5 wherein receiving an identification of hosts in the plurality of host computer systems that are to be checked to determine if the at least one new agent can be installed on those host computer systems comprises:
prompting a user to identify hosts in the plurality of host computer systems.

7. The method of claim 5 wherein receiving an identification of hosts in the plurality of host computer systems that are to be checked to determine if the at least one new agent can be installed on those host computer systems comprises:
dynamically performing a discovery operation to identify host computer systems in the storage area network that currently operate agents, each host that currently operates an agent being identified as a host within the plurality of host computer systems.

8. The method of claim 3 wherein presenting a list of the plurality of host computer systems and an indication of agents currently installed on each of the plurality of host computer systems that can be replaced with the at least one new agent in the media repository comprises:
comparing agent version information on agents that are currently installed on each of the plurality of host computer systems to agent version information of the at least one new agent in the media repository to identify which agents currently installed on each of the plurality of host computer systems can be replaced with the at least one new agent in the media repository.

9. The method of claim 8 wherein comparing agent version information on agents comprises:
identifying a plurality of different types of agents currently installed on the plurality of host computer systems that can be replaced with a newer version of a corresponding at least one new agent in the media repository, each different type of agent being responsible for managing a corresponding type of resource in the storage area network.

10. The method of claim 8 wherein presenting a list of the plurality of host computer systems and an indication of agents currently installed on each of the plurality of host computer systems that can be replaced with the at least one new agent in the media repository comprises:
presenting a list, for each host computer system in the plurality of host computer systems, that identifies a current version of an agent installed on that host computer system and a newer version of an agent available for installation on that host computer system from the media repository that can replace the current version of the agent.

11. The method of claim 2 wherein allowing a user to chose if the currently install agent on that host computer system is to be replaced by the corresponding new agent comprises:
allowing the user to chose that at least one currently installed agent on at least one host computer system of the plurality of host computer systems is to be replaced by the corresponding new agent while at least one other currently installed agent on that host computer system is not to be replaced by any new agent.

12. The method of claim 2 wherein performing prerequisite checking of each of the plurality of host computer systems to determine which host computer systems of the plurality of host computer system are capable of supporting operation of the at least one agent comprises:
performing communication with each of the plurality of host computer systems to initiate prerequisite checking on that host computer system to identify if a configuration of that host computer system will support operation of the at least one agent; and
for each of the plurality of host computer systems that has a configuration that will support operation of the at least one agent, prompting the user to confirm that the currently installed agent on that host computer system is to be replaced by the corresponding new agent.

13. The method of claim 1 wherein, for each host computer system of the plurality of host computer systems that is capable of supporting operation of the at least one agent, performing an automated bulk agent installation operation to install the at least one agent on that host computer system comprises:
for each host computer system, creating and performing a task to install the at least one agent on that host computer system, performing the task comprising:
configuring the host computer system for receipt of the at least one agent;
transferring the at least one agent to the host computer system for installation and operation of the at least one agent on the host computer system; and
providing respective status to a user concerning respective performance of a plurality of steps within the task as performance of the task occurs to install the at least one agent on that host computer system.

14. The method of claim 13 wherein configuring the host computer system for receipt of the at least one agent comprises:
instructing the host computer system to stop execution of a current agent on the host computer system that corresponds to a type of agent to be installed on the host computer system; and
performing prerequisite checking for that host computer system to determine that the host computer system is capable of supporting operation of the at least one agent to be installed on that host computer system.

15. The method of claim 14 wherein performing prerequisite checking for that host computer system to determine that the host computer system is capable of supporting operation of the at least one agent to be installed on that host computer system comprises:
determining that agent support software other than the at least one agent is required to be installed and operable on the host computer system;
and in response to determining that agent support software other than the at least one agent is required to be installed and operable on the host computer system, causing the host computer system to perform an agent support software check to determine if the agent support software is installed and operable on that host computer system; and
if the agent support software check determines that required agent support software is not installed and operable on that host computer system, causing the operation of transferring the at least one agent to the host computer system for installation of the at least one agent on the host computer system to also transfer the required agent support software for installation within the host computer system.

16. The method of claim 15 wherein transferring the at least one agent to the host computer system for installation of the at least one agent on the host computer system comprises:
transferring an agent installation package including an installation script and new agent code for that at least one agent to the host computer system, the installation script configured to operate on that host computer system to:
i) install the new agent code in the host computer system;
ii) preserve a customized configuration of a current agent for use by the new agent code on the host computer system;

iii) send status concerning the state of installation of the new agent code in the host computer system; and detecting completion status of installation of the new agent code and if the completion status is successful, in response, instructing the host computer system to begin execution of the new agent code on the host computer system.

17. The method of claim 13 wherein providing respective status to a user concerning respective performance of a plurality of steps within the task as performance of the task occurs to install the at least one agent on that host computer system comprises at least one of:

providing confirmation of completion of stopping execution of the current agent;

providing a confirmation of completion of a backing up of the agent;

providing a confirmation of completion of saving any customized configuration of the current agent;

providing confirmation of completion of installation of the new agent; and providing confirmation when the new agent started successfully and is operable.

18. A computer system comprising:

a memory;

a processor;

a communications interface;

an interconnection mechanism coupling the memory, the processor and the communications interface, wherein the memory is encoded with an agent installer that when executed on the processor causes the computer system to install an agent on a plurality of host computer systems by performing the operations of:

in a storage area network, identifying at least one agent to be installed on a plurality of host computer systems, wherein said storage area network includes one or more servers which interconnect through a switching fabric to a group of data storage systems to allow access to the stored data by said servers on behalf of client computer systems that request such data, and wherein said at least one agent executes on host computer systems to receive commands from a management server to configure and control various managed resources within the storage area network;

performing prerequisite checking of each of the plurality of host computer systems to determine which host computer systems of the plurality of host computer system are capable of supporting operation of the at least one agent; and for each host computer system of the plurality of host computer systems that is capable of supporting operation of the at least one agent, performing an automated bulk agent installation operation to install the at least one agent on that host computer system.

19. The computer system of claim 18 wherein when the computer system performs the operation of identifying at least one agent to be installed on a plurality of host computer systems, the computer system performs the operations of:

for each agent currently installed on the plurality of host computer systems can be replaced with a corresponding new agent, and for each host computer system of the plurality of host computer systems, allowing a user to select if the currently installed agent on that host computer system is to be replaced by the corresponding new agent using an automated bulk installation process;

and wherein when the computer system performs the operation of performing an automated bulk agent installation operation to install the at least one agent on that host computer system, the computer system performs the operations of:

determining that agent support software other than the at least one agent is required to be installed and operable on the host computer system and in response, installing the agent support software during installation of the at least one agent; and saving a custom configuration of the current agent for use by the new agent.

20. A computer readable storage medium encoded with programmed logic code that, when executed on a computer system, forms an agent installer that performs bulk agent installation by causing the computer system to perform the operations of:

in a storage area network, identifying at least one agent to be installed on a plurality of host computer systems, wherein said storage area network includes one or more servers which interconnect through a switching fabric to a group of data storage systems to allow access to the stored data by said servers on behalf of client computer systems that request such data, and wherein said at least one agent executes on host computer systems to receive commands from a management server to configure and control various managed resources within the storage area network; and for each host computer system of the plurality of host computer systems that is capable of supporting operation of the at least one agent, performing an automated bulk agent installation operation to install the at least one agent on that host computer system.

* * * * *